United States Patent
Patra et al.

(10) Patent No.: US 11,205,050 B2
(45) Date of Patent: Dec. 21, 2021

(54) LEARNING PROPERTY GRAPH REPRESENTATIONS EDGE-BY-EDGE

(71) Applicant: Oracle International Corporation, Redwood Shores, CA (US)

(72) Inventors: Rhicheek Patra, Zurich (CH); Sungpack Hong, Palo Alto, CA (US); Jinha Kim, Sunnyvale, CA (US); Damien Hilloulin, Zurich (CH); Davide Bartolini, Obersiggenthal (CH); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 130 days.

(21) Appl. No.: 16/179,049

(22) Filed: Nov. 2, 2018

(65) Prior Publication Data

US 2020/0142957 A1    May 7, 2020

(51) Int. Cl.
*G06F 40/30* (2020.01)
*G06N 20/10* (2019.01)
(Continued)

(52) U.S. Cl.
CPC ............. *G06F 40/30* (2020.01); *G06N 3/04* (2013.01); *G06N 3/08* (2013.01)

(58) Field of Classification Search
CPC .... G06F 40/211; G06F 40/253; G06F 40/268; G06F 40/284; G06F 40/30;
(Continued)

(56) References Cited

U.S. PATENT DOCUMENTS 9,240,184 B1 * 1/2016 Lin ................ G10L 15/142
9,798,818 B2 * 10/2017 Ho ................ G06F 16/9535
(Continued)

OTHER PUBLICATIONS

Li et al., Effective Representing of Information Network by Variational Autoencoder, 2017, IJCAI (IJCAI-17), pp. 2103-2109 (Year: 2017).*

(Continued)

*Primary Examiner* — Lamont M Spooner
(74) *Attorney, Agent, or Firm* — Hickman Becker Bingham Ledesma LLP (57) ABSTRACT

Techniques are described herein for learning property graph representations edge-by-edge. In an embodiment, an input graph is received. The input graph comprises a plurality of vertices and a plurality of edges. Each vertex of the plurality of vertices is associated with vertex properties of the respective vertex. A vertex-to-property mapping is generated for each vertex of the plurality of vertices. The mapping maps each vertex to a vertex-property signature of a plurality of vertex-property signatures. A plurality of edge words is generated. Each edge word corresponds to one or more edges that each begin at a first vertex having a particular vertex-property signature of the plurality of vertex property signatures and end at a second vertex having a particular vertex-property signature of the plurality of vertex property signatures. A plurality of sentences is generated. Each sentence comprises edge words directly connected along a path of a plurality of paths in the input graph. Using the plurality of sentences and the plurality of edge words, a document vectorization model is used to generate machine learning vectors that represent the input graph.

14 Claims, 6 Drawing Sheets

(51) Int. Cl.
*G06N 3/04* (2006.01)
*G06N 3/08* (2006.01)

(58) Field of Classification Search
CPC ...... G06F 19/0924; G06N 20/00; G06N 3/08; G06N 3/088; G06N 3/0454
See application file for complete search history.

(56) References Cited

U.S. PATENT DOCUMENTS

| | | | | |
|---|---|---|---|---|
| 9,852,231 | B1* | 12/2017 | Ravi | G06N 20/00 |
| 10,102,294 | B2* | 10/2018 | Ho | G06F 16/243 |
| 10,147,036 | B2* | 12/2018 | Ho | G06F 16/9535 |
| 10,152,550 | B2* | 12/2018 | Ho | G06F 16/243 |
| 10,482,375 | B2* | 11/2019 | Rossi | G06K 9/6232 |
| 10,535,007 | B2* | 1/2020 | Kang | G06N 5/02 |
| 10,628,507 | B2* | 4/2020 | Ho | G06F 16/9535 |
| 2003/0018608 | A1* | 1/2003 | Rice | G06F 21/606 |
| 2007/0239694 | A1* | 10/2007 | Singh | G06F 16/9024 |
| 2010/0121792 | A1* | 5/2010 | Yang | G06F 16/9024 |
| | | | | 706/12 |
| 2010/0306158 | A1* | 12/2010 | Andersen | G06F 17/10 |
| | | | | 706/52 |
| 2011/0173189 | A1* | 7/2011 | Singh | G06F 16/9024 |
| | | | | 707/722 |
| 2014/0149376 | A1* | 5/2014 | Kutaragi | G06F 16/532 |
| | | | | 707/706 |
| 2015/0030231 | A1* | 1/2015 | Porikli | G06T 7/162 |
| | | | | 382/154 |
| 2015/0052126 | A1* | 2/2015 | Bordino | G06F 16/9535 |
| | | | | 707/725 |
| 2018/0137155 | A1* | 5/2018 | Majumdar | G06F 16/28 |
| 2018/0247224 | A1* | 8/2018 | Garcia Duran | G06N 5/022 |
| 2019/0095806 | A1* | 3/2019 | Martinez Canedo | G06F 16/9024 |
| 2019/0130264 | A1* | 5/2019 | Rossi | G06N 5/022 |
| 2019/0251480 | A1* | 8/2019 | Garcia Duran | G06N 20/00 |
| 2020/0042857 | A1* | 2/2020 | Fang | G06N 3/08 |
| 2020/0074246 | A1* | 3/2020 | Goyal | G06K 9/6274 |
| 2020/0082265 | A1* | 3/2020 | Rossi | G06K 9/6232 |

OTHER PUBLICATIONS

Pan et al., Tri-Party Deep Network Representation, 2016, IJCAI-16), pp. 1-8 (Year: 2016).*
Narayanan, graph2vec: Learning Distributed Representations of Graphs, 2017, journal=arXiv preprint arXiv: 1707.05005, pp. 1-8. (Year: 2017).*
Yanardag et al., Deep Graph Kernels, 2015, Proceedings of the 21th ACM SIGKDD international conference on knowledge discovery and data mining, pages=1365-1374 (Year: 2015).*
Gardner et al., Efficient and Expressive Knowledge Base Completion Using Subgraph Feature Extraction, 2015, Proceedings of the 2015 Conference on Empirical Methods in Natural Language Processing, pp. 1488-1498 (Year: 2015).*
Rossi et al., Higher-order Network Representation Learning), Apr. 2018, Companion Proceedings of the The Web Conference 2018 , pp. 3-4 (Year: 2018).*
Shirui Pan et al., "Tri-Party Deep Network Representation" 25th International Joint Conference on Artificial Intelligence, dated Jul. 9, 2016, 8 pages.
Palash Goyal et al., "Capturing Edge Attributes via Network Embeddings", dated May 22, 2018, 10 pages.
Liu Zhengming et al., "Incorporating Label and Attribute Information for Enhanced Network Representation Learning", dated Apr. 20, 2018 IEEE, pp. 71-77.

* cited by examiner

| Hyper-parameters 204 | |
|---|---|
| Max Walk length | 3 |
| Walks per vertex | 2 |
| M | Count |
| N | Count |

Vertex-to-string Mapping 208

| vertex-id | Mapping to string |
|---|---|
| 1 | Entity:USER Size:M(4) Count:N(1) |
| 2 | Entity:ALERT Size:M(4) Count:N(2) |
| 3 | Entity:ADDRESS Size:M(4) Count:N(1) |
| 4 | Entity:ALERT Size:M(4) Count:N(2) |

Property Edge Vocabulary 206

| [1~2] ~ [2~3] ~ [3~4] = PGX1 ~ PGX2 ~ PGX3 |
| [1~4] ~ [4~3] ~ [3~2] = PGX1 ~ PGX2 ~ PGX3 |
| [2~3] ~ [3~4] ~ [4~1] = PGX1 ~ PGX2 ~ PGX4 |
| [2~1] ~ [1~4] ~ [4~3] = PGX4 ~ PGX1 ~ PGX2 |
| [3~2] ~ [2~1] ~ [1~4] = PGX3 ~ PGX4 ~ PGX1 |
| [3~4] ~ [4~1] ~ [1~2] = PGX3 ~ PGX4 ~ PGX1 |
| [4~1] ~ [1~2] ~ [2~3] = PGX4 ~ PGX1 ~ PGX2 |
| [4~3] ~ [3~2] ~ [2~1] = PGX2 ~ PGX3 ~ PGX4 |

Vertex-to-random walks Mapping 202

| vertex-id | Random Walks |
|---|---|
| 1 | 1 ~ 2 ~ 3 ~ 4 |
| 1 | 1 ~ 4 ~ 3 ~ 2 |
| 2 | 2 ~ 3 ~ 4 ~ 1 |
| 2 | 2 ~ 1 ~ 4 ~ 3 |
| 3 | 3 ~ 2 ~ 1 ~ 4 |
| 3 | 3 ~ 4 ~ 1 ~ 2 |
| 4 | 4 ~ 1 ~ 2 ~ 3 |
| 4 | 4 ~ 3 ~ 2 ~ 1 |

Edge-word Dictionary 210

| PGX1 | Entity:USER Size:M(4) Count:N(1) Entity:ALERT Size:M(4) Count:N(2) | {[1~2],[1~4]} |
| PGX2 | Entity:ALERT Size:M(4) Count:N(2) Entity:ADDRESS Size:M(4) Count:N(1) | {[2~3],[4~3]} |
| PGX3 | Entity:ADDRESS Size:M(4) Count:N(1) Entity:ALERT Size:M(4) Count:N(2) | {[3~4],[3~2]} |
| PGX4 | Entity:ALERT Size:M(4) Count:N(2) Entity:USER Size:M(4) Count:N(1) | {[4~1],[2~1]} |

LEARNING PROPERTY GRAPH REPRESENTATIONS EDGE-BY-EDGE

FIELD OF THE INVENTION

The present invention relates to graph processing and machine learning techniques based on learned representations of graphs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An important ability of property graphs is their ability to model the latent relationships in graphs and capture linked information (i.e., entity relationships) that other data models fail to capture. In any property graph, the nodes (i.e., entities) and the edges (i.e, linked relationship between entities) are associated with some properties which are <key, value> pairs, for e.g., label: customer or label: employee.

While at the same time, machine learning techniques are employed in multiple domains to uncover "hidden insights" through learning from patterns and trends in the data. Property graphs are employed in various tasks like link predictions (e.g., friendship recommendation), classification (e.g., fraud detection), ranking (e.g., node importance) or similarity search (e.g., searching similar chemical compounds). Such tasks present the possibility of applying various machine learning techniques to property graphs.

Graph representation learning has enabled a smooth integration of machine learning techniques and property graphs. The graph representation learning objective is to find a task-agnostic way to represent graph structure (in low-dimensional space) so that classical machine learning models could be exploited for multiple applications employing the learned representations. An approach to featurizing graph structures is graph kernels, which primarily employ handcrafted features e.g., shortest paths, graphlets, page rank scores. However, neural embeddings promises a new direction for graph representation learning to combine the success of machine learning into property graphs.

A type of representation learning is vertex-level representation learning, which represents close nodes (where closeness could be structural closeness or property-oriented closeness) as similar vectors in the representation vector space. This learning objective benefits vertex-level tasks such as vertex classification or vertex clustering. Traditionally, machine learning techniques rely on handcrafted user-defined features (e.g., centrality measures) to encode the structural information about vertices in a graph. However, another approach is to learn embeddings by employing random walks (with vertices as learning units) followed by a skipgram model to learn the vertex representations. A variant of random walks maximizes the likelihood of preserving neighborhoods of nodes by employing biased random walks to explore diverse neighborhoods.

Compared to vertex-level representations, some tasks might require higher granularity of a graph, i.e., representation of the whole graph. Graph representations can benefit multiple tasks like graph classification tasks (fraud or anomalous patterns), similarity search over a database of graphs (e.g., drugs) or even fingerprint identification. Similar to the vertex representations, there are the options of handcrafted user-defined features to encode the structural information of graphs e.g., sub-graphs. Another approach views an entire graph as a document and the rooted sub-graphs around every node in this graph as words to compose that document but do not consider any ordering among the words (i.e., subgraphs).

However, both of these representations have their drawbacks, as both representations are less than optimal when employed with various machine learning models.

Discussed herein are approaches for improving quality of graph-based machine learning results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for learning property graph representations edge-by-edge.

A property graph comprises a plurality of vertices and a plurality of edges. Each vertex of the plurality of vertices is associated with vertex properties of the respective vertex. For example, a particular vertex of the property graph may include properties such as 'Entity type', 'Graph Size', 'Similar entity count', and 'Vertex-id', such as the property graph shown in FIG. 1.

Using the property graph, a vertex-to-property mapping is generated for each vertex of the plurality of vertices of the graph. The mapping maps each vertex to a vertex-property signature of a plurality of vertex-property signatures where each vertex-property signature comprise a string representation of the properties of a vertex. Using hyper-parameters, a series of random walks is generated. Each random walk comprises a sequence of vertex-ids where each vertex has a set of vertex properties. For example, a random walk of the graph of FIG. 1 may comprise [1~2~3~4] or [1~4~3~2] where each number indicates a vertex-id.

A plurality of edge words is then generated. Each edge word corresponds to one or more edges of the property graph that each begin at a first vertex having a particular vertex-property signature of the plurality of vertex property signatures and end at a second vertex having a particular vertex-property signature of the plurality of vertex property signatures. Each edge word comprises a string representation of the vertex properties of the first vertex concatenated with the vertex properties of the second vertex. For example, an edge word may comprise the string 'Entity:USER Size:M(4) Count:N(1) Entity:ALERT Size:M(4) Count:N(2)' as representing the edge between vertex '1' and vertex '2' from FIG. 1.

A plurality of sentences is then generated. Each sentence comprises edge words directly connected along a path of a plurality of paths in the input graph. The sentences may be generated based on the random walks and edge words and is represented by a string of concatenated edge words. For example, a sentence may comprise the string 'Entity:USER Size:M(4) Count:N(1) Entity:ALERT Size:M(4) Count:N(2) Entity:ALERT Size:M(4) Count:N(2) Entity:ADDRESS Size:M(4) Count:N(1) Entity:ADDRESS Size:M(4) Count:N(1) Entity:ALERT Size:M(4) Count:N(2)'.

Using the plurality of sentences and the plurality of edge words, a document vectorization model is used to generate machine learning vectors that represent the input graph. The sentences may be used as input to a vectorization model such as doc2vec, as described herein, to produce learned vectors that capture an improved representation of the data of the property graph.

Thus, techniques described herein extract features out of property-graph representations of data sets. These features can be used to train ML models, serving as very strong signals, and thereby resulting in significant improvement of the quality of the answer.

Compared to existing techniques, techniques described herein capture the original graphically represented information of the data set much better, thereby resulting in higher quality of the answers and drastically improving the classification accuracy of machine learning classification models. Techniques described herein result in dimensionality reduction, i.e. low dimensional representations for the vertices in the graph. The dimensionality of the features may be reduced, requiring smaller input vectors, and/or matrixes to store and process, thereby reducing storage and CPU processing needed for training machine learning models or executing machine learning models in applications of machine learning models. In addition, the machine learning models trained may have smaller model artifacts (see section MACHINE LEARNING MODELS), thereby further reducing storage and CPU processing needed for training machine learning models or executing machine learning models in applications of machine learning models.

Graph Initialization

Graph analytics software such as Parallel Graph AnalytiX (PGX) may be used to initialize a property graph for vectorization. As referred to herein, PGX is a toolkit for graph analysis—both running algorithms such as PageRank against graphs, and performing SQL-like pattern-matching against graphs, using the results of algorithmic analysis. Algorithms are parallelized for extreme performance. The PGX toolkit includes both a single-node in-memory engine, and a distributed engine for extremely large graphs. Graphs can be loaded from a variety of sources including flat files, SQL and NoSQL databases and Apache Spark and Hadoop. PGX is commercially available through ORACLE CORPORATION.

In an embodiment, graph analytics software such as PGX loads a graph with an Edgelist file and Edge JSON file. The Edgelist file contains graph information in edge-list format regarding vertex objects and the edge objects to build the graphs.

The Edge JSON file is a JSON file that reads the graph data from the Edgelist file and generates a graph. In an embodiment, the Edge JSON file generates a PgxGraph, a java class of graphs that is operable by PGX. In an embodiment, a graph is loaded using PGX's 'readGraphWithProperties' functionality.

Graphs are generated based on original vertex properties and computed vertex properties. In the above-mentioned edge-list format, it is possible to pre-define multiple original vertex properties while loading the graph into a graph analytics framework such as PGX. For example, if there are multiple graphs comprising varying graph-ids, then a vertex property can be added that indicates which graph the specific vertex belongs too. Then, the complete set of graphs can be loaded into PGX as a single large graph with multiple connected components and the individual connected components can be filtered out into separate graphs using such specific vertex property. Additionally, a unique vertex-id is assigned to all the vertices from different graphs in our dataset (i.e., no two graphs will have same vertex-ids).

Additional vertex properties may be defined, referred to herein as computed properties, depending on the requirement of the associated ML model that uses the graph data as input. For example, a ML model may require incorporating some "importance" values for the individual vertices while matching similar graphs. Such importance values could be added as computed properties to the vertices. In our empirical evaluation, we also employ the size of the graph (which the vertex is a part of) as one of our vertex properties In another example, the size of the graph, which the vertex is a part of, may be included as one of the vertex properties.

Figure 1:
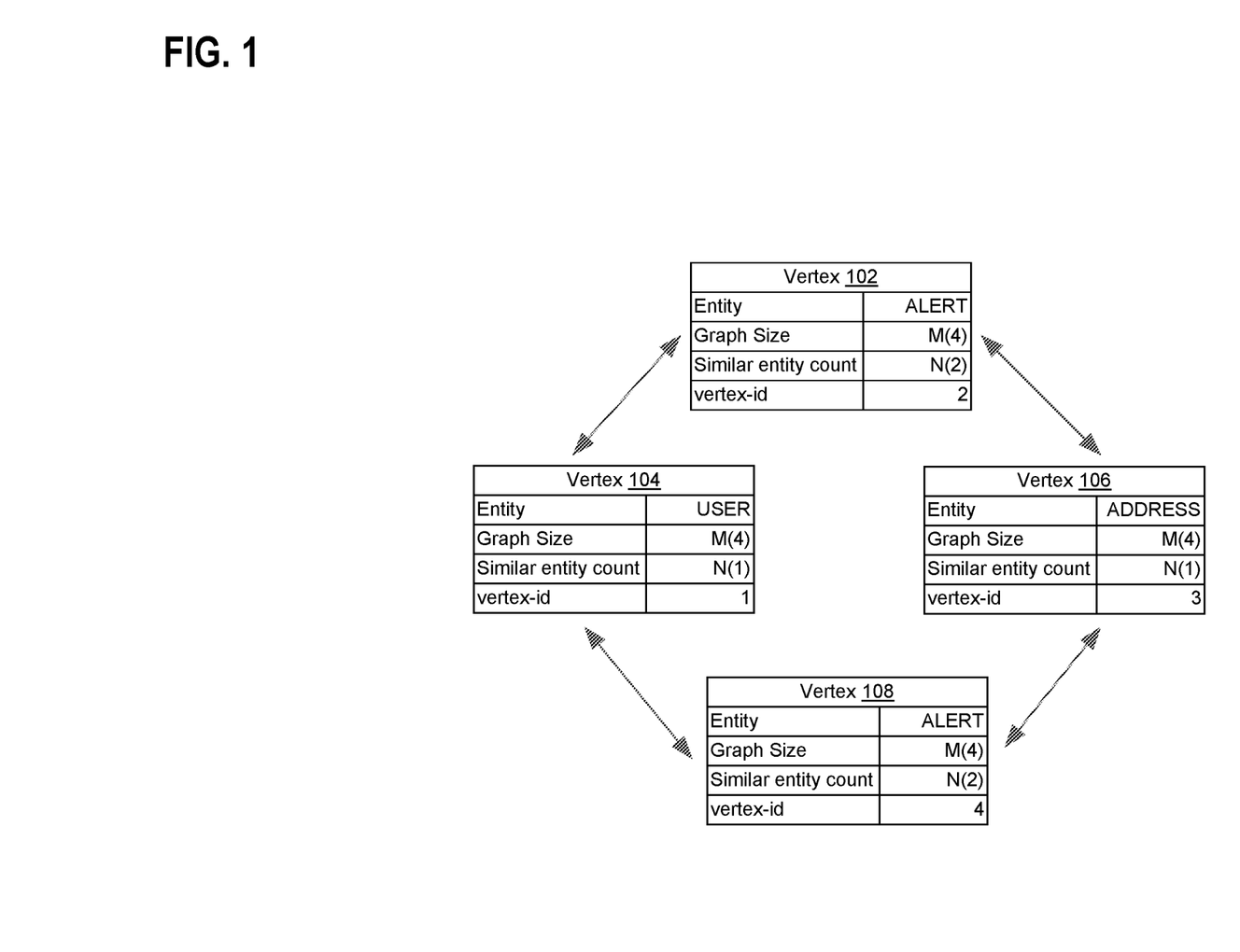
FIG. 1 illustrates a property graph with associated properties for each vertex.

FIG. 1 illustrates a property graph with associated properties for each vertex. In FIG. 1, the property graph includes four vertices 102, 104, 106, 108. Each vertex 102, 104, 106, 108 has properties associated with it such as 'Entity', 'Graph Size', 'Similar entity count', and 'vertex-id'. The graph includes one original property for each vertex 102, 104, 106, 108: 'Entity', and 2 computed properties: 'Graph Size' and 'Similar entity count'. Properties may include functions such as 'M( . . . )' and 'N( . . . )' from the 'Graph Size' and "Similar entity count" fields, respectively, that can be tuned depending on the level of granularity required for the different properties. In an embodiment, the property graph is an undirected graph. An undirected graph may be defined as a graph whose edges are unordered pairs of vertices. That is, each edge connects two vertices and each edge is bidirectional.

Random Walks

Once a property graph is initialized, graph analytics software such as PGX may be used to generate random walks of a graph in a parallelized manner. A random walk is a sequence of vertices from a graph. Generating random walks for a graph requires at least two hyper-parameters such as a number of random walks per vertex and maximum length of random walk. The number of random walks per vertex hyper-parameter controls the different possible random walks starting from a given vertex and ideally captures the neighborhood of any given vertex.

The maximum length of a random walk hyper-parameter controls the depth of the neighborhood to consider for learning the graph representations. This parameter is task dependent and may require tuning.

```
procedure random_walk_generator(G: graph, length: int,
    num_walks: int; walks: nodeProp<string>) {
    foreach(n: G.nodes) {
        int walk_count = 0;
        string walk = "";
        while (walk_count < num_walks) {
            walk += create_walk(G, n, length);
            walk += "|"; // walk delimiter
            walk_count++;
        }
        n.walks = walk;
    }
}
local create_walk(G: graph, n: node, length: int) : string {
    string walk = "";
    int i = 0;
    node current = n;
    while (i < length-1) {
        walk += current + " "; // node delimiter
        current = current.pickRandomNbr( );
        i++;
    }
    walk +=current.pickRandomNbr( );
    return walk;
}
```

As shown in the above code snippet, the 'random_walk_generator' function returns random-walks based on the hyperparameters 'length' and 'num_walks'. In the above code snippet, the collection of all graphs is treated as a single big graph and input to the 'RandomWalkGenerator' function for parallelization in extracting random walks over all of the graphs. The graph-id corresponding to a random walk is obtained by employing the graph-id property of vertex.

Figure 2:
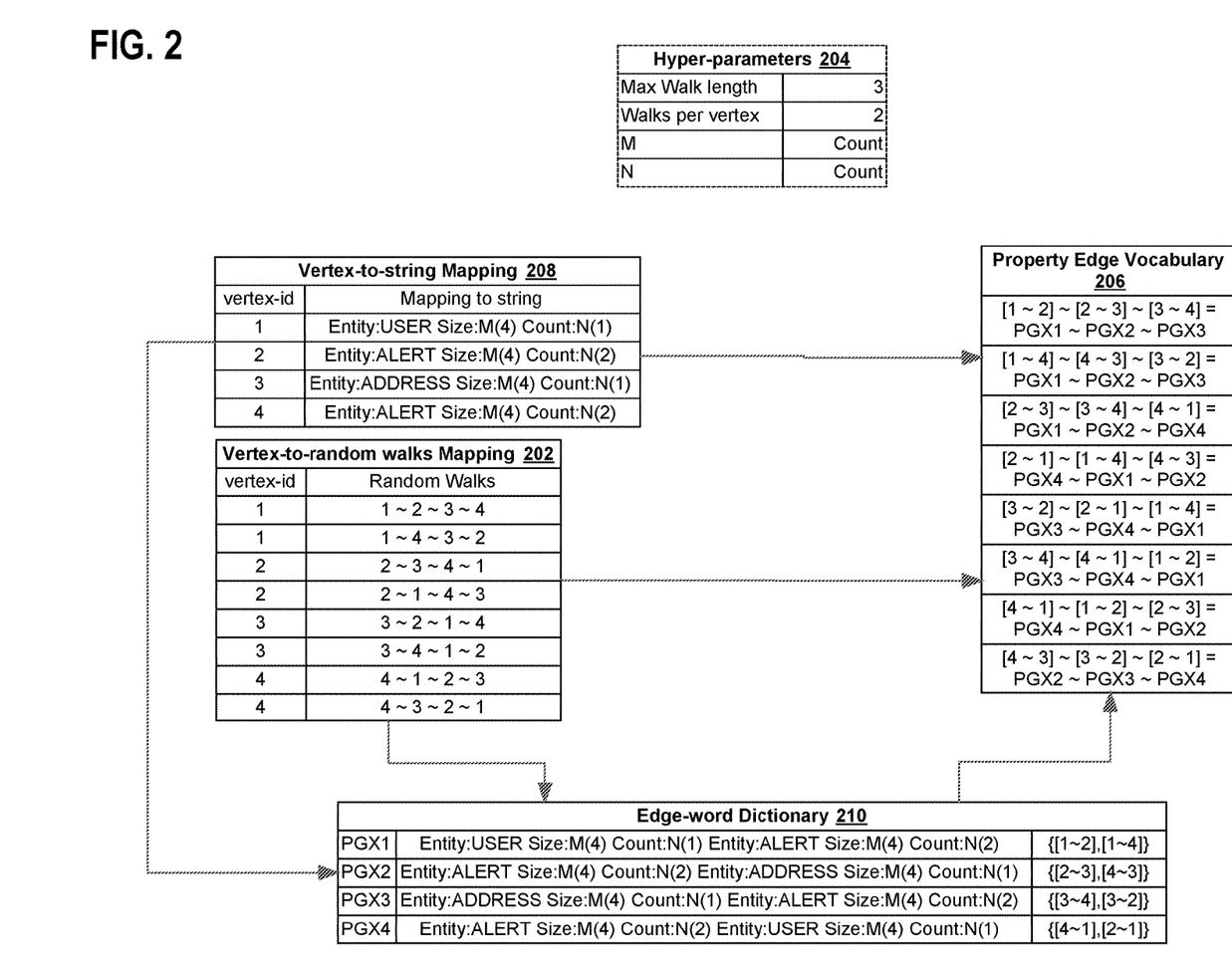
FIG. 2 illustrates an edge-word generation diagram.

FIG. 2 illustrates an edge-word generation diagram. FIG. 2 includes a vertex-to-random walks mapping 202 that maps random walks generated by the above code snippet to vertex-ids. Each generated random-walk is a string of vertex-ids where each vertex-id of the random walk is separated by a delimiter. Because the hyper-parameters 204 indicate that there are 2 walks per vertex with a max walk length of 3, each vertex-id has two random walks with a length of 3 associated with it in the vertex-to-random walks mapping 202. As shown, each random walk comprises a sequence of vertex-ids where each vertex has a set of vertex properties which may be original, computed, or both.

Edge Word Generation

After random walks are generated, a property edge vocabulary 206 is generated by utilizing the random walks.

In an embodiment, there are two sub-steps to create the property edge vocabulary 206. The first sub-step includes generating a vertex-to-string mapping 208. To generate a vertex-to-string mapping 208, a vertex-id for a vertex of the graph is mapped to a vertex property string in the format: 'Entity: . . . Size: M( . . . ) Count: N( . . . )' where the properties are 'Entity' (type of entity), 'Size' (number of vertices in the component graph), and 'Count' (number of other similar entities in the component graph). For example, vertex-to-string mapping 208 shows 'vertex-id: 1' mapped to the string 'Entity:USER Size:M(4) Count:N(1)'.

The second sub-step includes generating an edge-word dictionary. The edges of the graph are identified based on the random walks for each vertex. For example, the vertex-to-random walks mapping 202 may be used to identify the edges. Each edge comprises a source and destination vertex, for example: '[1~2]' where '1' is the source vertex and '2' is the destination vertex. The strings for the source and destination vertices of an edge are retrieved from the vertex-to-string mapping and the source and destination vertices for the edge are concatenated to form an edge word. For example, 'Entity: USER Size: M(4) Count: N(1) Entity: ALERT Size: M(4) Count: N(2)' denotes an edge word for the edge '[1~2]' as shown in the edge-word dictionary 210. For each random walk, the edges are determined and are mapped to edge-words, as shown in the edge-word dictionary 210.

The edge-word dictionary 210 is then used with the vertex-to-random walks mapping 202 to generate a property edge vocabulary 206. The edges are identified from the vertex-to-random walks mapping 202, and each edge is replaced with the corresponding edge-word from the edge-word dictionary. The edge-words associated with a random-walk are then concatenated to form a sentence for the random walk.

For example, for the random walk '1~2~3~4', the edges '[1~2]~[2~3]~[3~4]' are identified. The source and destination vertices for each edge are concatenated to form an edge word for each of the three identified edges, which are stored in the edge-word dictionary 210. The three edge words, respectively, are: 'Entity:USER Size:M(4) Count:N(1) Entity:ALERT Size:M(4) Count:N(2)', 'Entity:ALERT Size:M(4) Count:N(2) Entity:ADDRESS Size:M(4) Count:N(1)', and 'Entity:ADDRESS Size:M(4) Count:N(1) Entity:ALERT Size:M(4) Count:N(2)'. The three edge words are then concatenated to form a sentence for the random walk: 'Entity:USER Size:M(4) Count:N(1) Entity:ALERT Size:M(4) Count:N(2) Entity:ALERT Size:M(4) Count:N(2) Entity:ADDRESS Size:M(4) Count:N(1) Entity:ADDRESS Size:M(4) Count:N(1) Entity:ALERT Size:M(4) Count:N(2).' Pointers such as PGX1, 'PGX2', 'PGX3', 'PGX4' may be used to point to sentences comprised of edge words, as shown in the edge-word dictionary 210 and property edge vocabulary 206.

Vectorization

Once a graph has been transformed into sentences and edge-words, the sentences and edge-words are used to learn the graph representations. An unsupervised algorithm such as Doc2vec may be used to generate vectors based on the sentences and edge-words. Doc2vec learns fixed-length feature representations from variable-length pieces of texts, i.e., documents. Doc2vec treats each graph as a document and the edge-words as the corresponding words in this document. The distributed memory model used by Doc2vec employs neural networks, as discussed herein, with optimizations for hierarchical softmax and negative sampling for practical performance improvements. Technical details and examples of doc2vec are taught in the related reference "DISTRIBUTED REPRESENTATIONS OF SENTENCES AND DOCUMENTS," by Quoc Le and Tomas Mikolov, June 2014.

Example Procedure

Figure 3:
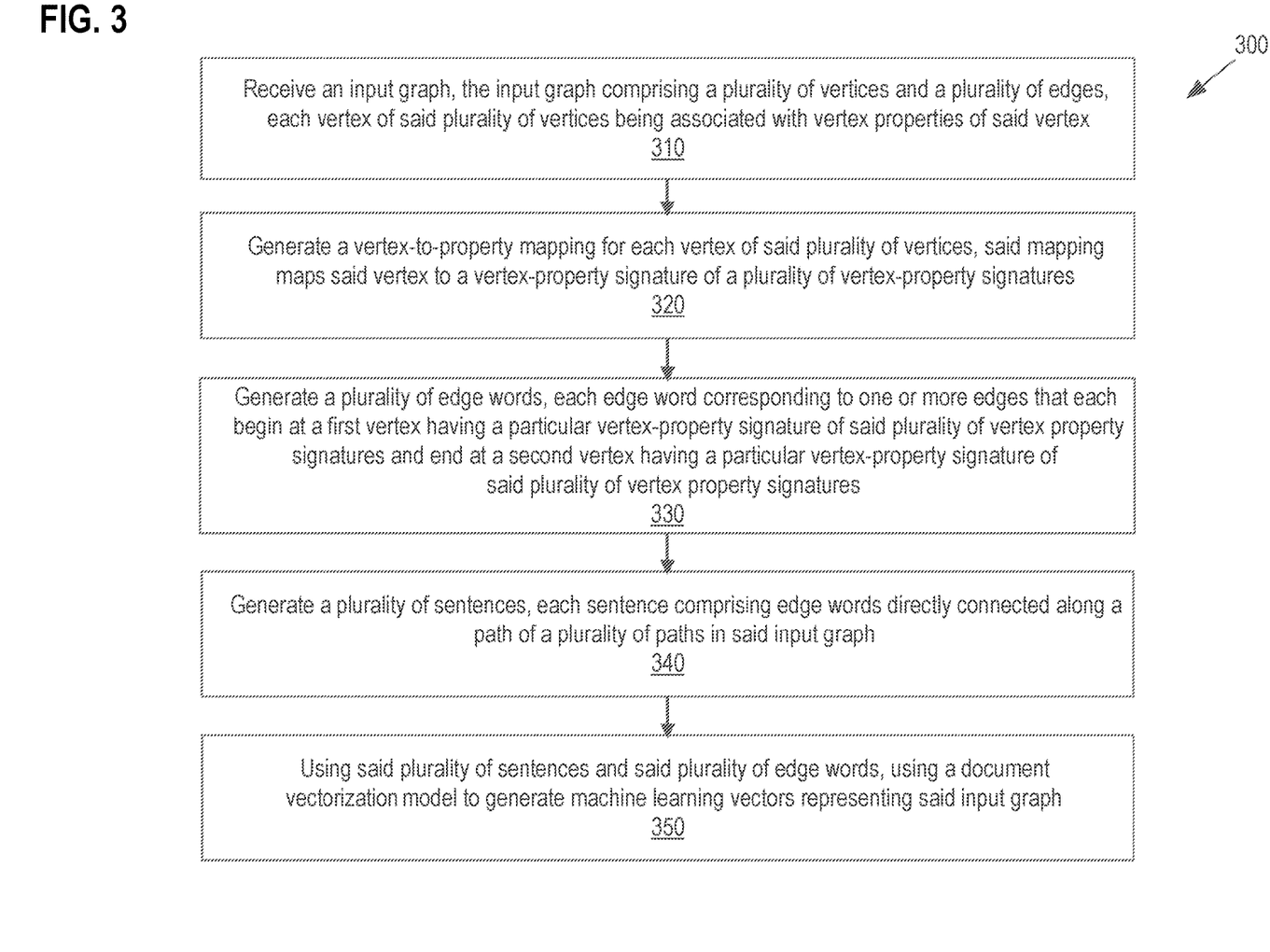
FIG. 3 shows an example procedure for learning property graph representations edge-by-edge, according to an embodiment.

FIG. 3 shows an example procedure flow 300 for learning property graph representations edge-by-edge. Flow 300 is one example of a flow for learning property graph representations edge-by-edge. Other flows may comprise fewer or additional elements, in varying arrangements.

In step 310, an input graph is received. The input graph comprises a plurality of vertices and a plurality of edges, each vertex of said plurality of vertices is associated with vertex properties of said vertex. For example, FIG. 1 illustrates an example input graph. Each vertex 102, 104, 106, 108 includes properties such as 'Entity', 'Graph Size', 'Similar entity count', and 'vertex-id'. Each property of each vertex has a corresponding value such as 'USER' for the property 'Entity'.

In step 320, a vertex-to-property mapping is generated for each vertex of the plurality of vertices. The vertex-toproperty mapping maps each vertex of the plurality of vertices to a vertex-property signature of a plurality of vertex-property signatures. For example, the vertex-to-string mapping 208 from FIG. 2 illustrates an example vertex-to-property mapping. As shown by the vertex-to-string mapping 208, each vertex-id is mapped to the properties and values of the corresponding vertex, as referred to as a vertex-property signature. Vertex-to-string mapping 208 shows four different vertex-property signatures, including: 'Entity:USER Size:M(4) Count:N(1)', 'Entity:ALERT Size:M(4) Count:N(2)', 'Entity:ADDRESS Size:M(4) Count:N(1)', 'Entity:ALERT Size:M(4) Count:N(2)'. Each vertex-property signature is mapped to vertex-ids: 1, 2, 3, 4, respectively. The vertex-to-property mapping and vertex-property signatures are generated by reading the properties and values from the input graph of FIG. 1 and concatenating each property and corresponding value into a string representation for each vertex.

In step 330, a plurality of edge words is generated. Each edge word of the plurality of edge words corresponds to one or more edges that each begin at a first vertex having a first particular vertex-property signature of the plurality of vertex property signatures and end a second vertex having a second particular vertex-property signature of the plurality of vertex property signatures. For example, the edge-word dictionary 210 from FIG. 2 illustrates an example of a plurality of edge words. As shown by the edge-word dictionary 210, each edge word is mapped to corresponding edges. Edge-word dictionary 210 lists four edge words, including: 'Entity:USER Size:M(4) Count:N(1) Entity:ALERT Size:M(4) Count:N(2)', 'Entity:ALERT, Size:M(4) Count:N(2) Entity:ADDRESS Size:M(4) Count:N(1)', 'Entity:ADDRESS Size:M(4) Count:N(1) Entity:ALERT Size:M(4) Count:N(2)', 'Entity:ALERT Size:M(4) Count:N(2) Entity:USER Size:M(4) Count:N(1)'. Each edge word is associated with one or more edges, as shown in the edge-word dictionary 210.

In an embodiment, the edge words are generated based on edges identified from random walks and the vertex-to-property mapping. Once the edges are identified from the random walks, the vertex-property signatures for each vertex of an edge are concatenated to generate an edge word. For example, from the vertex-to-random walks mapping 202, vertex id: 1 include the random walks 1~2~3~4 and 1~4~3~2. From the random walks, several edges are identified including [1~2], [2~3], [3~4], [1~4], [4~3], [3~2]. For the edge [1~2], the edge begins at vertex '1' and ends at vertex '2'. The vertex-to-property signatures for each vertex are identified form the vertex-to-string mapping 208 as 'Entity:USER Size:M(4) Count:N(1)' and 'Entity:ALERT Size:M(4) Count:N(2)', respectively. The vertex-property signatures are then concatenated to generate the edge word: 'Entity:USER Size:M(4) Count:N(1) Entity:ALERT Size:M(4) Count:N(2)' and the edge word is stored in the edge-word dictionary 210. As shown in edge-word dictionary 210, the edge word 'Entity:USER Size:M(4) Count:N(1) Entity:ALERT Size:M(4) Count:N(2)' corresponds to two edges: [1~2], [1~4]'.

In step 340, a plurality of sentences is generated, each sentence of the plurality of sentence comprising edge words directly connected along a path of a plurality of paths in said input graph. For example, property edge vocabulary 206 from FIG. 2 illustrates plurality of generated sentences. Each entry in the property edge vocabulary 206 represents a sentence. The first entry [1~2]~[2~3]~[3~4]=PGX1~PGX2~PGX3'. Pointers 'PGX1', 'PGX2', 'PGX3' point to edge words from the edge word dictionary 210.

Paths are identified from random walks. For example, from the vertex-to-random walks mapping 202, the random walk '1~2~3~4' is converted into a sequential set of edges such as [1~2]~[2~3]~[3~4]'. The edge-word dictionary 210 is used to identify each edge word that each edge of the path corresponds to. For example, the edge-word dictionary 210 is used to identify that the edge [1~2], maps to edge word: 'Entity:USER Size:M(4) Count:N(1) Entity:ALERT Size:M(4) Count:N(2)', which also corresponds to the pointer PGX1'.

Once each edge word from the path is identified, the edge words are concatenated to form a sentence. For example, for the path [1~2]~[2~3]~[3~4]', the sentence is: 'Entity:USER Size:M(4) Count:N(1) Entity:ALERT Size:M(4) Count:N(2) Entity:ALERT Size:M(4) Count:N(2) Entity:ADDRESS Size:M(4) Count:N(1) Entity:ADDRESS Size:M(4) Count:N(1) Entity:ALERT Size:M(4) Count:N(2)'.

In step 350, using said plurality of sentences and said plurality of edge words, using a document vectorization model to generate machine learning vectors representing said input graph. For example, the plurality of sentences generated in step 340 are used an input to a document vectorization model. In an embodiment, the document vectorization model comprises doc2vec.

In an embodiment, steps 310-350 are performed for a plurality of input graphs. Thus, machine learning vectors are generated for a plurality of input graphs.

Benefits for Improved Classificaton Accuracy

Figure 4:
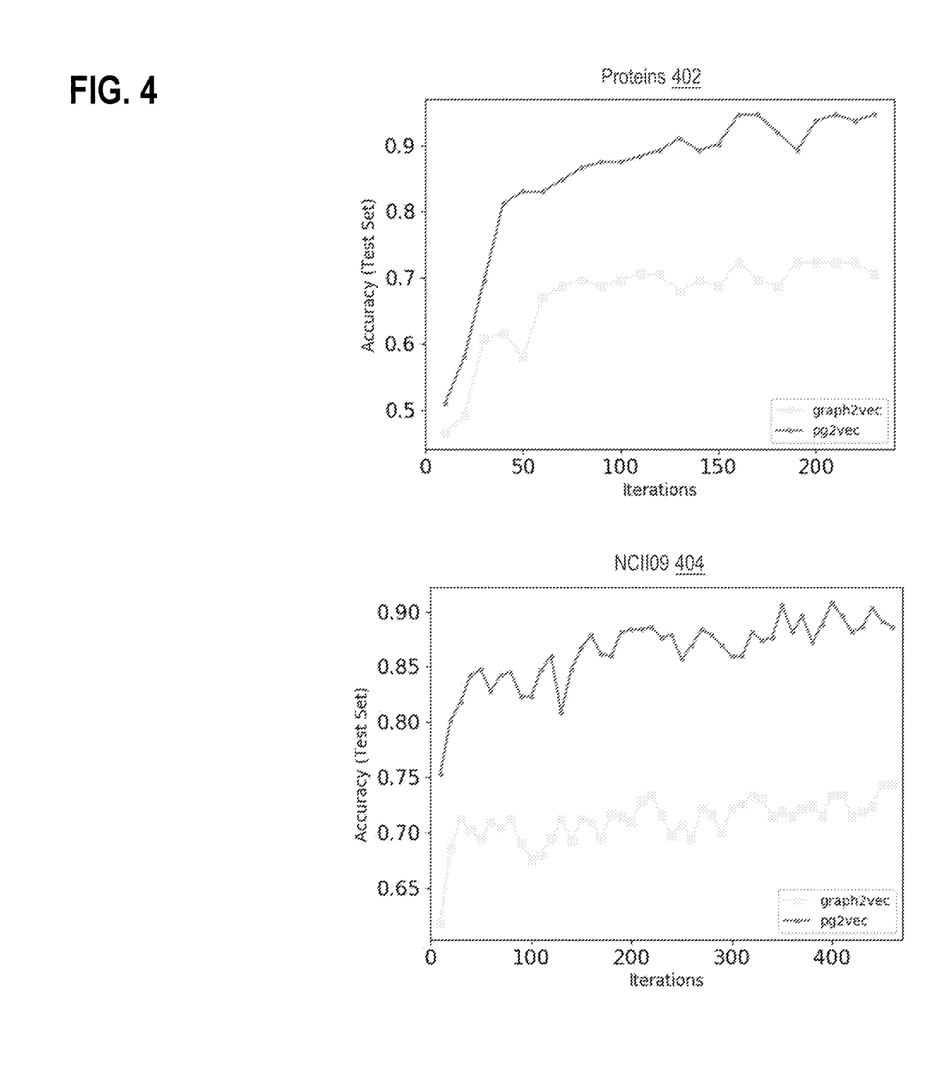
FIG. 4 illustrates the improved classification accuracy using the techniques described herein with two different datasets.

FIG. 4 illustrates the improved classification accuracy using the techniques described herein with two different datasets. For example, a NCI109 dataset consists of chemical compounds screened for activity against non-small cell lung cancer and ovarian cancer cell lines. PROTEINS is a graph collection (graphs being classified as enzyme or non-enzyme) where nodes are secondary structure elements and edges indicate neighborhoods in the amino-acid sequence or in 3D space. A classifier (e.g. Convolutional Neural Network) is trained to predict the associated labels for each graph by employing the learnt embeddings for the approach described herein, e.g. generating vectors for sentences based on edge-words using doc2vec, and another approach, e.g. generating vectors based on entire graphs using graph2vec, as the input features of the graph. The train:test ratio is set to 9:1 and each dataset is evaluated on the test set.

The techniques described herein result in a 15% improvement in classification accuracy compared to another graph representation structure employing sub-graphs, i.e. graph2vec. The improvement can be seen graphically in the proteins 402 graph and the NCII09 404 as the difference in classification accuracy between the graph2vec and doc2vec algorithms. Technical details and examples of graph2vec are taught in the related reference "GRAPH2VEC: LEARNING DISTRIBUTED REPRESENTATIONS OF GRAPHS," by Annamalai Narayanan, Mahinthan Chandramohan, Rajasekar Venkatesan, Lihui Chen, Yang Liu and Shantanu Jaiswa, July 2017. The improvement is attributed to the impact of the property edges as compact learning units whereas the sub-graph representation partially suffers from the sparsity issue of embeddings due to the rigid embedded property relations in its sub-graph learning units.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

Figure 5:
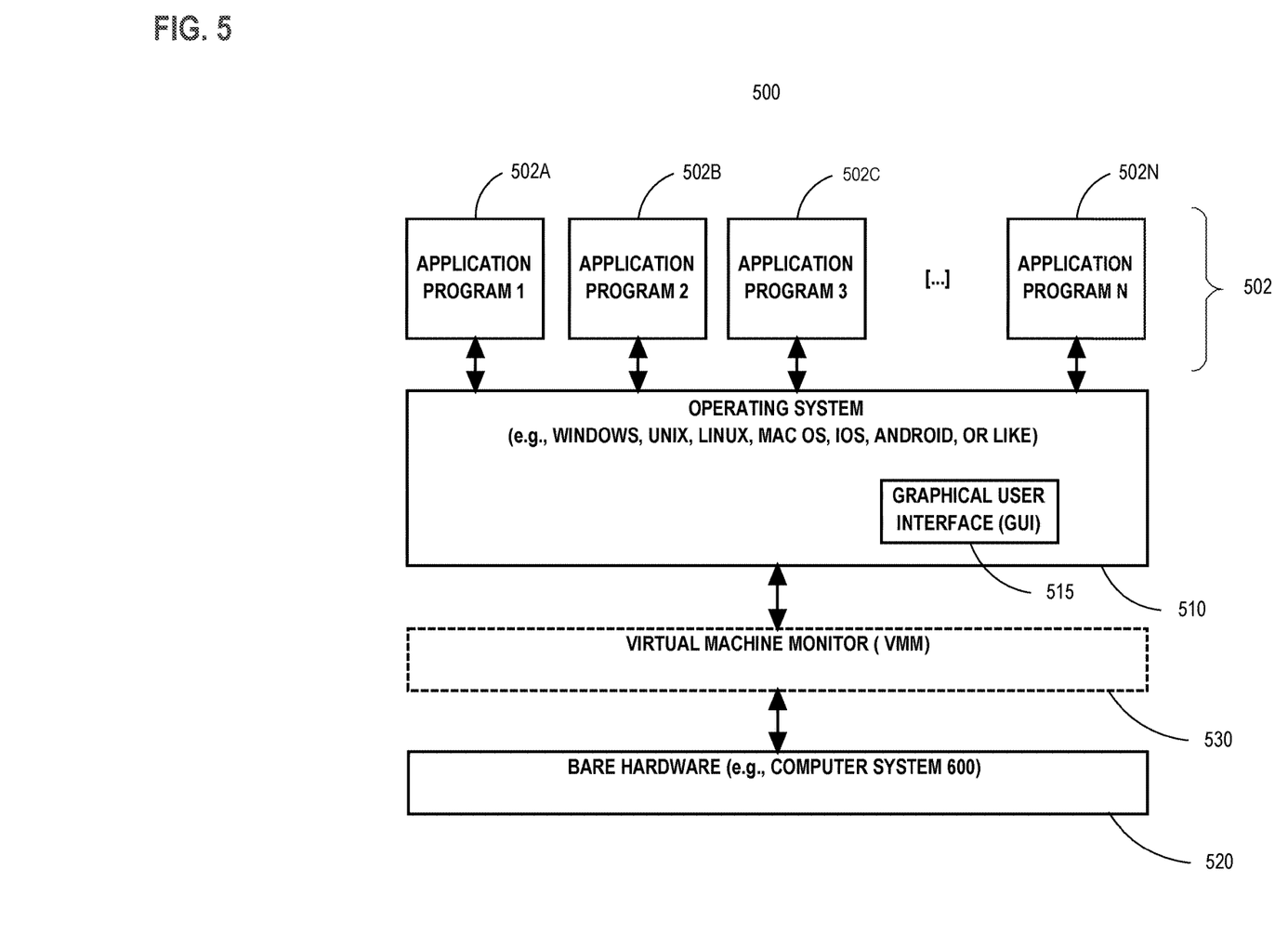
FIG. 5 is a diagram depicting a software system upon which an embodiment of the invention may be implemented.
Figure 6:
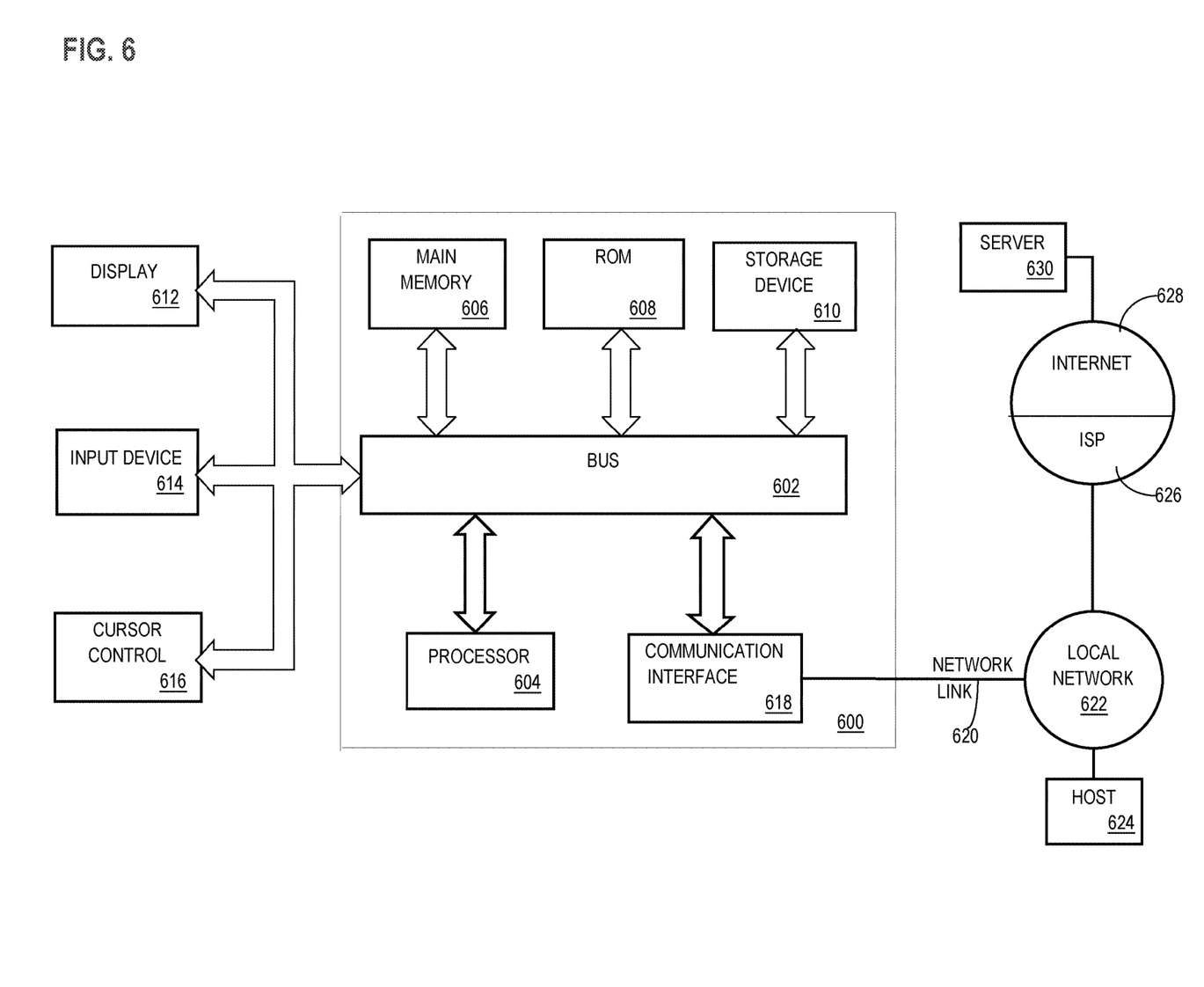
FIG. 6 is a diagram depicting a computer system that may be used in an embodiment of the present invention.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Machine Learning Models

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures For Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller the matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of an adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving an input graph comprising a plurality of subgraphs, wherein the input graph comprises a plurality of vertices and a plurality of edges, each vertex of said plurality of vertices being associated with vertex properties of said vertex;
generating a vertex-to-property mapping, wherein for each vertex of said plurality of vertices, said vertex-to-property mapping maps said vertex to a vertex-property signature of a plurality of vertex-property signatures;
generating a plurality of edge words, each edge word corresponding to one or more edges that each begin at a first vertex having a particular vertex-property signature of said plurality of vertex-property signatures and end at a second vertex having a particular vertex-property signature of said plurality of vertex-property signatures;
generating a plurality of random walks based on one or more hyperparameters, each random walk comprising a sequence of vertices from a subgraph of the plurality of subgraphs of the input graph, wherein each path of a plurality of paths is based on a random walk of the plurality of random walks;
generating a plurality of sentences, each sentence comprising edge words directly connected along a path of the plurality of paths in said input graph, each sentence representing a subgraph of the plurality of subgraphs of said input graph; and
using said plurality of sentences, using a doc2vec algorithm to generate a plurality of machine learning vectors, each machine learning vector of the plurality of machine learning vectors representing a subgraph of the plurality of subgraphs.

2. The method of claim 1, wherein the input graph comprises an undirected graph.

3. The method of claim 1, wherein each vertex-property signature comprises a string representation of vertex properties of a vertex.

4. The method of claim 1, wherein each edge word comprises a string representation of the vertex properties of the first vertex concatenated with the vertex properties of the second vertex.

5. The method of claim 1, wherein the plurality of edge words is generated based on the plurality of random walks and the vertex-to-property mapping.

6. The method of claim 1, wherein each sentence of the plurality of sentences comprises a string representation of an edge word of the plurality of edge words concatenated with one or more other edge words of the plurality of edge words.

7. The method of claim 1, further comprising:
training a classifier based on the plurality of machine learning vectors.

8. One or more non-transitory computer-readable media storing instructions which, when executed by one or more computing devices, cause:
receiving an input graph comprising a plurality of subgraphs, wherein the input graph comprises a plurality of vertices and a plurality of edges, each vertex of said plurality of vertices being associated with vertex properties of said vertex;
generating a vertex-to-property mapping, wherein for each vertex of said plurality of vertices, said vertex-to-property mapping maps said vertex to a vertex-property signature of a plurality of vertex-property signatures;
generating a plurality of edge words, each edge word corresponding to one or more edges that each begin at a first vertex having a particular vertex-property signature of said plurality of vertex-property signatures and end at a second vertex having a particular vertex-property signature of said plurality of vertex property signatures;
generating a plurality of random walks based on one or more hyperparameters, each random walk comprising a sequence of vertices from a subgraph of the plurality of subgraphs of the input graph, wherein each path of a plurality of paths is based on a random walk of the plurality of random walks;
generating a plurality of sentences, each sentence comprising edge words directly connected along a path of the plurality of paths in said input graph, each sentence representing a subgraph of the plurality of subgraphs of said input graph; and
using said plurality of sentences, using a doc2vec algorithm to generate a plurality of machine learning vectors, each machine learning vector of the plurality of machine learning vectors representing a subgraph of the plurality of subgraphs.

9. The one or more non-transitory computer-readable media of claim 8, wherein the input graph comprises an undirected graph.

10. The one or more non-transitory computer-readable media of claim 8, wherein each vertex-property signature comprises a string representation of vertex properties of a vertex.

11. The one or more non-transitory computer-readable media of claim 8, wherein each edge word comprises a string representation of the vertex properties of the first vertex concatenated with the vertex properties of the second vertex.

12. The one or more non-transitory computer-readable media of claim 8, wherein the plurality of edge words is generated based on the plurality of random walks and the vertex-to-property mapping.

13. The one or more non-transitory computer-readable media of claim 8, wherein each sentence of the plurality of sentences comprises a string representation of an edge word of the plurality of edge words concatenated with one or more other edge words of the plurality of edge words.

14. The one or more non-transitory computer-readable media of claim 8, wherein the instructions, when executed by the one or more computing devices, further cause:
training a classifier based on the plurality of machine learning vectors.

* * * * *

UNITED STATES PATENT AND TRADEMARK OFFICE
CERTIFICATE OF CORRECTION

PATENT NO. : 11,205,050 B2
APPLICATION NO. : 16/179049
DATED : December 21, 2021
INVENTOR(S) : Patra et al.

It is certified that error appears in the above-identified patent and that said Letters Patent is hereby corrected as shown below:

On the Title Page

On page 2, Column 2, item (56), under Other Publications, Line 6, delete "21th" and insert -- 21st --, therefor.

On page 2, Column 2, item (56), under Other Publications, Line 13, delete "Learning)," and insert -- Learning, --, therefor.

On page 2, Column 2, item (56), under Other Publications, Line 14, delete "the The" and insert -- The --, therefor.

In the Specification

In Column 4, Line 34, delete "properties" and insert -- properties. --, therefor.

In Column 4, Line 46, delete ""Similar entity count"" and insert -- 'Similar entity count' --, therefor.

In Column 5, Line 15, delete "length-l) (" and insert -- length-1) { --, therefor.

In Column 5, Line 20, delete "current,pick" and insert -- current.pick --, therefor.

In Column 6, Line 30, delete "PGX1," and insert -- 'PGX1', --, therefor.

In Column 7, Line 60, delete "[1~2]," and insert -- '[1~2], --, therefor.

In Column 7, Line 67, delete "[1~2]" and insert -- '[1~2] --, therefor.

In Column 8, Line 7, delete "[1~2]" and insert -- '[1~2] --, therefor.

In Column 8, Line 12, delete "PGX1'." and insert -- 'PGX1'. --, therefor.

Signed and Sealed this
Nineteenth Day of April, 2022

Katherine Kelly Vidal
*Director of the United States Patent and Trademark Office*

CERTIFICATE OF CORRECTION (continued)
U.S. Pat. No. 11,205,050 B2

In Column 8, Line 15, delete "[1~2]" and insert -- '[1~2] --, therefor.

In Column 8, Line 29, delete "Classificaton" and insert -- Classification --, therefor.

In Column 8, Line 32, delete "NCI109" and insert -- NCII09 --, therefor.

In Column 8, Lines 56-57, delete "Raj asekar" and insert -- Rajasekar --, therefor.

In Column 9, Line 44, delete "DbaaS" and insert -- DBaaS --, therefor.

In Column 11, Line 65, delete "programing" and insert -- programming --, therefor.

In Column 13, Line 47, delete "and or" and insert -- and/or --, therefor.

In the Claims

In Column 20, Line 19, in Claim 8, delete "vertex property" and insert -- vertex-property --, therefor.